United States Patent
Kiser et al.

(10) Patent No.: US 10,470,950 B2
(45) Date of Patent: Nov. 12, 2019

(54) RETRACTABLE RAMP SYSTEM FOR MOTORIZED VEHICLE

(71) Applicant: THE BRAUN CORPORATION, Winamac, IN (US)

(72) Inventors: Aaron Kiser, Royal Center, IN (US); James Stoner, Star City, IN (US)

(73) Assignee: The Braun Corporation, Winamac, IN (US)

( * ) Notice: Subject to any disclaimer, the term of this patent is extended or adjusted under 35 U.S.C. 154(b) by 23 days.

(21) Appl. No.: 15/486,509

(22) Filed: Apr. 13, 2017

(65) Prior Publication Data

US 2017/0216113 A1 Aug. 3, 2017

Related U.S. Application Data

(63) Continuation of application No. PCT/US2015/060297, filed on Nov. 12, 2015.
(Continued)

(51) Int. Cl.
*A61G 3/06* (2006.01)
*B60P 1/43* (2006.01)

(52) U.S. Cl.
CPC .............. *A61G 3/061* (2013.01); *B60P 1/433* (2013.01); *A61G 3/067* (2016.11); *Y10S 414/134* (2013.01)

(58) Field of Classification Search
CPC . A61G 3/061; A61G 3/067; B60P 1/43; B60P 1/433; Y10S 414/134
(Continued)

(56) References Cited

U.S. PATENT DOCUMENTS 5,971,465 A 10/1999 Ives et al.
6,802,095 B1 * 10/2004 Whitmarsh ............. B60P 1/431
14/69.5
(Continued)

FOREIGN PATENT DOCUMENTS

FR 2997665 A1 5/2014
GB 2543471 A * 4/2017 ............. A61G 3/061
(Continued)

OTHER PUBLICATIONS

European Patent Office, Extended European Search Report issued in European Application No. 15860309.2, dated May 24, 2018, 8 Pages.
(Continued)

*Primary Examiner* — James Keenan
(74) *Attorney, Agent, or Firm* — Taft Stettinius & Hollister LLP; Stephen F. Rost

(57) ABSTRACT

A retractable ramp system for facilitating mobility-challenged individual's entrance to and exit from a structure, particularly, from a motorized vehicle. The ramp system includes a frame having a front member, a first side member, a second side member, a rear member, and a floor. The rear member is pivotally coupled to the frame between an open position and a closed position. The ramp system includes a first track coupled to the first side member and defining a longitudinal channel therein, and a second track coupled to the second side member and defining a longitudinal channel therein. A ramp is pivotally coupled to the first and second tracks about a pivot axis, and includes a ramp floor, a first side panel, and a second side panel. The system includes a latch to maintain the ramp in a stowed position.

20 Claims, 10 Drawing Sheets

Related U.S. Application Data

(60) Provisional application No. 62/082,385, filed on Nov. 20, 2014.

(58) Field of Classification Search
USPC ........................................................ 414/921
See application file for complete search history.

(56) References Cited

U.S. PATENT DOCUMENTS

| | | | |
|---|---|---|---|
| 7,150,487 B2* | 12/2006 | Devitt | B60P 1/433 |
| | | | 296/61 |
| 9,597,240 B2* | 3/2017 | Hermanson | A61G 3/061 |
| 2004/0146385 A1 | 7/2004 | Edwards et al. | |
| 2004/0228713 A1 | 11/2004 | Cohn et al. | |
| 2005/0179269 A1* | 8/2005 | Weiland | B60J 5/105 |
| | | | 293/149 |
| 2008/0284194 A1 | 11/2008 | Bower et al. | |
| 2009/0044729 A1* | 2/2009 | Navarre | B60P 1/43 |
| | | | 108/44 |
| 2012/0009050 A1* | 1/2012 | Pepin | B60P 1/435 |
| | | | 414/537 |
| 2014/0255138 A1* | 9/2014 | Bruns | A61G 3/061 |
| | | | 414/537 |

FOREIGN PATENT DOCUMENTS

| | | | |
|---|---|---|---|
| JP | 2002306535 A | 10/2002 | |
| JP | 2013141856 A * | 7/2013 | ............... B60P 1/43 |
| WO | 2010/003387 A1 | 1/2010 | |

OTHER PUBLICATIONS

The International Bureau of WIPO, International Preliminary Report on Patentability, dated May 23, 2017, 8 Pages, Geneva, Switzerland.

* cited by examiner

RETRACTABLE RAMP SYSTEM FOR MOTORIZED VEHICLE

CROSS-REFERENCE TO RELATED APPLICATION

This application is a continuation application of International Application Ser. No. PCT/US2015/060297, filed Nov. 12, 2015, which claims the benefit of U.S. Provisional Patent Application Ser. No. 62/082,385 entitled "Retractable Ramp System for Motorized Vehicle" filed on Nov. 20, 2014, the disclosures of which are hereby incorporated by reference in their entirety.

FIELD OF THE DISCLOSURE

The present disclosure relates to a ramp assembly for facilitating mobility-challenged individual's ascent to and descent from a structure, particularly, the present disclosure relates to retractable ramps used in motorized vehicles for efficient ingress and egress by wheelchair or scooter occupants.

BACKGROUND

Vehicles that provide transportation, such as taxis and the like, can be adapted for mobility-challenged individuals in order to provide such individuals the ability to travel in a manner similar to ambulatory passengers. Some of these vehicles have consisted of full-sized vans having an electrical or hydraulic powered wheelchair lift installed on the vehicle to assist wheelchair occupants into and out of the van. These lifts consisted of a horizontal platform that translates vertically to allow the wheelchair or scooter occupant easy access from ground level to the interior of the vehicle for transport. Other vehicles may have a ramp that can be electrically, hydraulically, or manually operated.

Some form of ramp allows the wheelchair occupant to be transported from the ground external to the vehicle to the floor within the modified vehicle. The ramp is typically stored in a vertical position in the rear or slide door entrance of the vehicle. To access the ramp, the ramp may be rotated outwardly about a pivot consisting of the lower end of the ramp located approximately at the floor of the van, until the opposite end of the ramp comes into contact with the ground.

While these types of ramps are generally reliable in function and provide the necessary access to the mobility vehicle, they block the vehicle entrance when stowed. These ramps also occupy valuable space in the interior of the vehicle and are not aesthetically pleasing. In vehicles such as taxis this is particularly problematic because when the vehicle is not transporting a mobility-challenged individual, the space occupied by the ramp obstructs and prevents the use of space otherwise available for luggage and the like.

SUMMARY

In one embodiment of the present disclosure, a retractable ramp system includes a frame having a front member, a first side member, a second side member, a rear member, and a floor. The rear member is pivotally coupled to the frame so that the rear member is pivotal between an open position and a closed position. The system includes a first track coupled to the first side member and defining a longitudinal channel therein, and a second track coupled to the second side member and defining a longitudinal channel therein. A ramp is pivotably coupled to the first and second tracks about a pivot axis, and includes a ramp floor, a first side panel, and a second side panel. The system includes a first latch member coupled to the first side panel and a second latch member coupled to the second side panel. A pin is coupled to one of the first side member and the second side member. The ramp is movable between a raised position, a lowered position, and a stowed position. One of the first latch member and the second latch member is coupled to the pin in the stowed position.

In another embodiment, there is provided a retractable ramp system including a frame having a front member, a first side member, a second side member, a rear member, and a floor. The rear member is pivotally coupled to the frame so that the rear member is pivotal between an open position and a closed position. A track system is coupled to the frame and a ramp is pivotably and slidably coupled to the track system. The ramp includes a ramp floor, a first side panel, and a second side panel. The ramp is movable between a raised position, a lowered position, and a stowed position. The rear member is movable between a raised position and a lowered position.

In one example, the pin includes a first pin coupled to the first side member and a second pin coupled to the second side member. In a second example, the first latch member is coupled to the first pin and the second latch member is coupled to the second pin in the stowed position. In a third example, the system includes a pivot pin and a cap including an annular body, and a key protruding from the annular body. The pivot pin is received within an opening defined in the key such that the ramp is pivotable about the pivot pin and key.

In a fourth example, a coupler is coupled to one of the first track and second track, the coupler having an open end for receiving the annular body of the cap. In a fifth example, the coupler comprises a first coupler and a second coupler, the first coupler being coupled to one end of the respective track and the second coupler being coupled to an opposite end thereof. In a sixth example, a movement of the ramp is restricted to a pivotal movement only when the cap is coupled to the coupler. In a seventh example, the ramp is slidably coupled to the first track and the second track between the raised position and the closed position.

In an eighth example of this embodiment, the ramp is independent from the rear member. In a ninth example, the ramp is disposable in the lowered position only when the rear member is in the open position. In a tenth example, a slotted opening is defined in the first track and second track, wherein the ramp is removably engaged from the first and second tracks via the slotted opening. In an eleventh example, one or more pads are coupled to the ramp. In a twelfth example, the frame floor comprises at least a first portion and a second portion, the first and second portions configured to be coupled to a floor of a vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
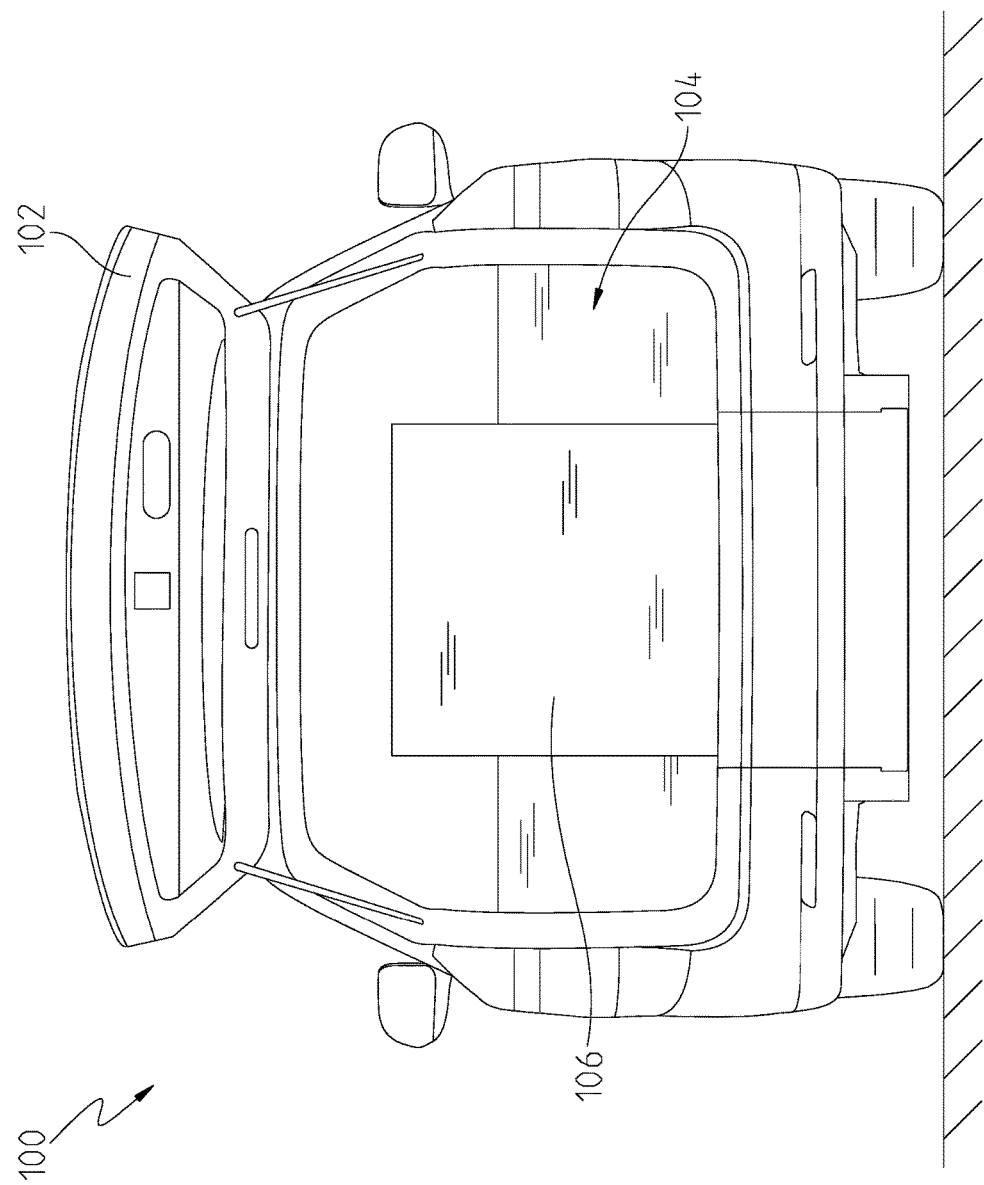
FIG. 1 is a rear view of a vehicle capable of transporting a mobility-challenged individual.

Referring now to FIG. 1, a vehicle 100 adapted for transporting a mobility-challenged individual is shown. The vehicle can be a van, taxi, bus, or any other type of vehicle capable of transporting a mobility-challenged individual. In FIG. 1, a rear end of the vehicle 100 is shown having a powered lift-gate 102 capable of being electrically, hydraulically, mechanically, or manually raised or lowered. When raised, the lift-gate exposes an access opening 104 to the rear of the vehicle 100. A ramp 106 is shown in a stowed position, i.e., a vertical orientation with respect to a floor of the vehicle 100. The ramp can be used to assist with transporting the mobility-challenged individual from a ground surface to a location inside of the vehicle.

Figure 2:
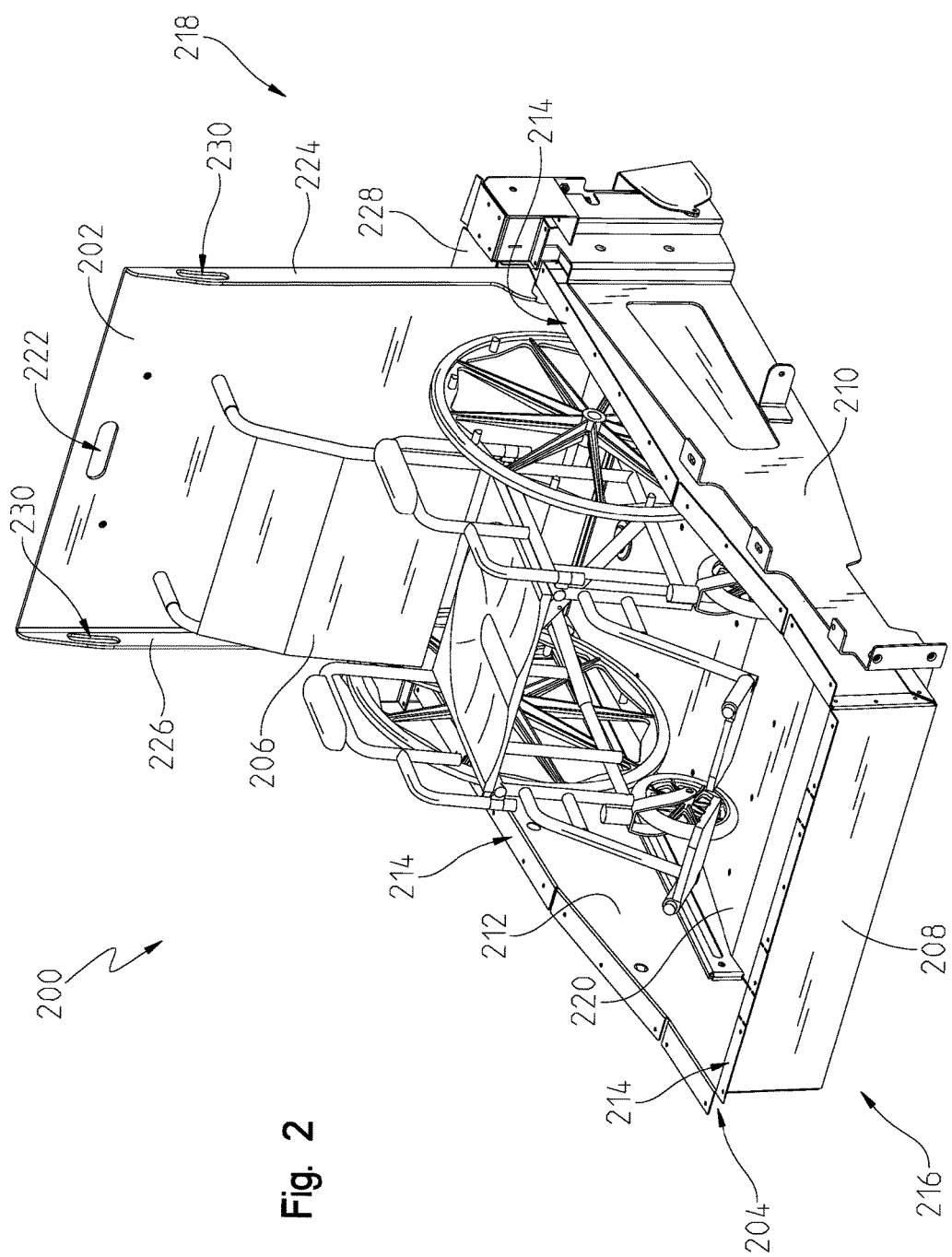
FIG. 2 is a front perspective view of a ramp system including a ramp in a stowed position for transporting a mobility-challenged individual.

In FIG. 2, for example, one embodiment is shown of a ramp system 200 capable of being adapted in a vehicle 100 similar to the one in FIG. 1. Here, the ramp system 200 includes a ramp 202 disposed in a stowed or vertical position. In this position, the ramp system 200 is capable of stowing a wheelchair 206, for example. To do so, the ramp system 200 may include a partial enclosure or frame 204 that includes at least a front member 208 disposed towards a front 216 of the ramp system 200, a rear member 228 disposed towards the rear 218 thereof, and a first side member 210 and a second side member 212. The first side member 210 and second side member 212 may each be coupled to the front member 208 and rear member 228 to form the frame 204. The frame 204 forms a cage-like structure that surrounds the wheelchair 206 when disposed inside of the vehicle 100.

Each of the front member 208, first side member 210, second side member 212, and rear member 228 can be formed of a robust material such as steel to offer protection to the wheelchair and, when occupied, to the occupant. Each member can further include a flange 522 (FIG. 5) that defines a top surface 214 as shown in FIG. 2. In some embodiments, the vehicle floor may be redesigned to a location beneath its conventional location, i.e., the floor level is lowered, so that a space is provided for the ramp system 200 to occupy inside the vehicle. In this embodiment, the top surface 214 of each of the front member 208, first side member 210, second side member 212, and rear member 228 can be arranged substantially parallel or aligned with the conventional floor level inside the vehicle. With the vehicle floor being lowered to a new location, sufficient clearance is provided in the vehicle so that an occupant sitting in the wheelchair 206 can do so comfortably.

As also shown, the ramp 202 of the ramp system 200 is shown in the vertical or stowed position. The ramp 202 can include a first side panel 224 and a second side panel 226. Each side panel extends in an approximately 90° angle with respect to a ramp surface 302 of the ramp 202. As such, the side panels offer side support to the ramp 202 when a wheelchair 206 is being moved on and off the ramp 202.

The ramp 202 can also include a main handle 222 defined within its main surface 302 for use to manually manipulate the ramp 202 between positions. In addition, each of the first side panel 224 and the second side panel 226 may include a side handle 230 as well. While there are several handles depicted in the embodiment of FIG. 2, it is to be understood that in alternative embodiments the ramp 202 may be controlled electronically or otherwise such that the handles are unnecessary to manipulate the ramp 202. Moreover, in other embodiments, the ramp 202 may be manipulated manually or automatically, i.e., there may be automatic means in the form of an electronic, hydraulic, mechanical, etc. mechanism to control positioning of the ramp 202.

Figure 3:
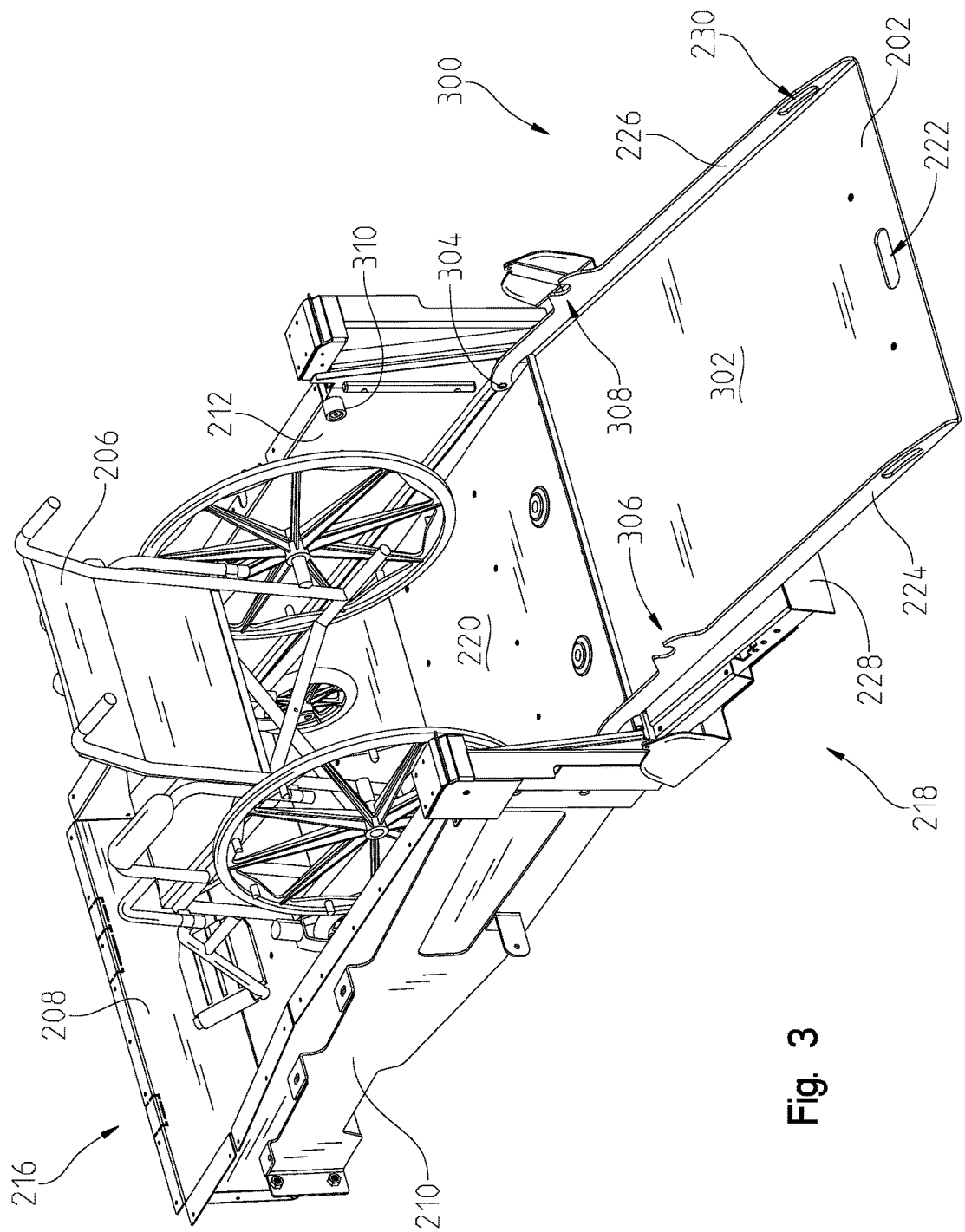
FIG. 3 is a rear perspective view of the ramp system of FIG. 2 with the ramp in a lowered position.

Referring to the embodiments of FIGS. 3-7, the ramp system 202 is capable of being maneuvered in a plurality of orientations or positions. In FIG. 3, for example, the ramp 202 is disposed in a lowered position 300. Here, the ramp 202 may be pivoted about a pivot pin 304 that defines a pivot axis from the stowed position of FIG. 2 to the lowered position 300 of FIG. 3. The pivot pin 304 is shown in greater detail in FIG. 8 and will be described below.

In the lowered position 300, the ramp 202 can be configured at an angle with respect to a floor or pan 220 of the enclosure 204. As described above, the frame 204 includes the front member 208, first side member 210, second side member 212, and rear member 228 to partially surround or enclose the wheelchair 206 in the stowed position. In this position, the ramp 202 may be disposed in its lowered position 300 so that the wheelchair 206 may be moved along the ramp surface 302 and into the interior of the vehicle 100. As the wheelchair 206 enters the interior of the vehicle 100, it may be rolled or moved onto the floor 220 of the enclosure 204. The floor 220 of the enclosure 204 may be in contact with the lowered vehicle floor (not shown). This, of course, is only the case when the vehicle floor is lowered from its conventional floor level. In those embodiments in which the vehicle floor is not lowered, the floor 220 may be in contact and rest above the vehicle floor at the conventional floor level.

Figure 5:
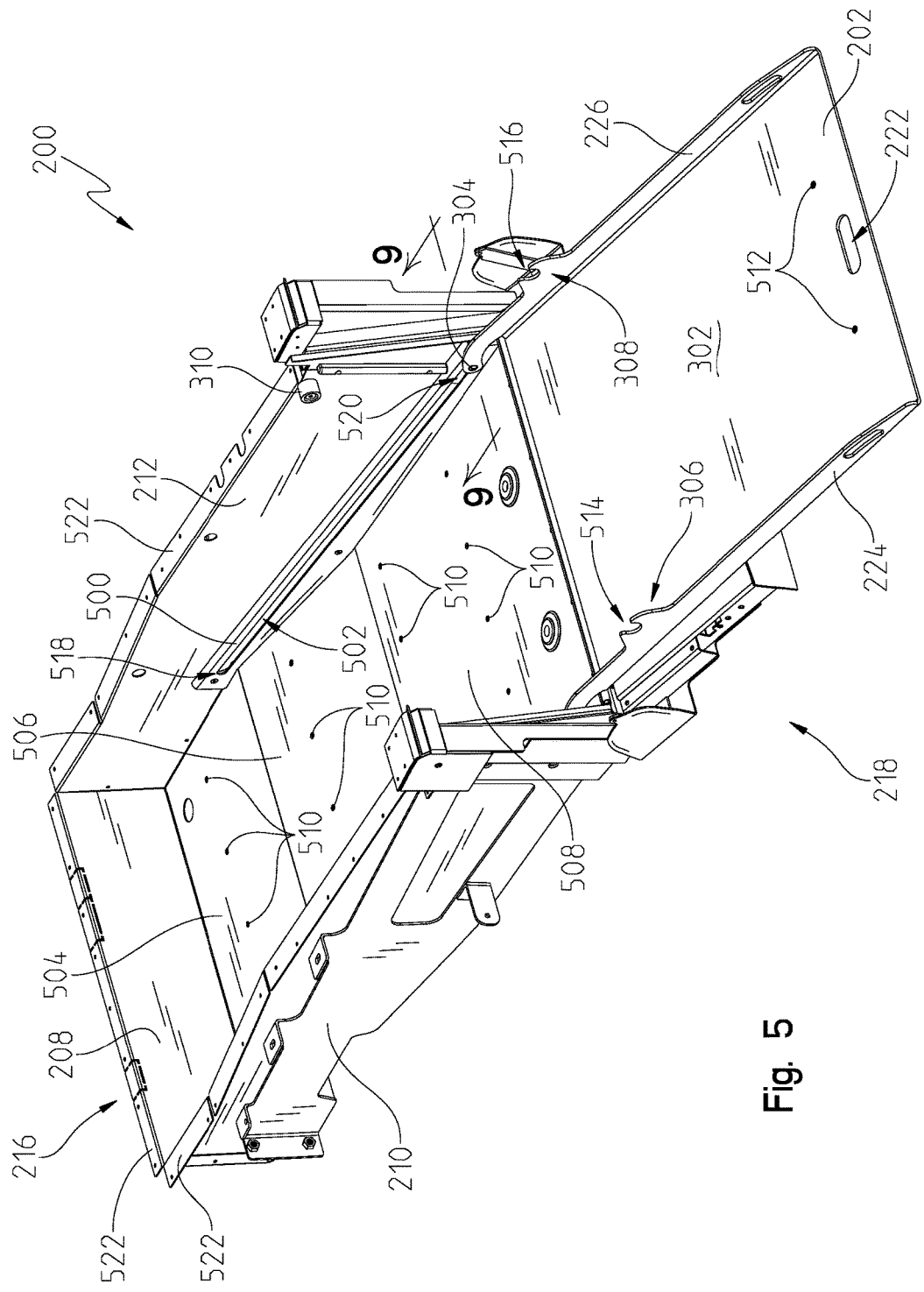
FIG. 5 is another rear perspective view of the ramp system of claim 2 with the ramp in the lowered position.
Figure 6:
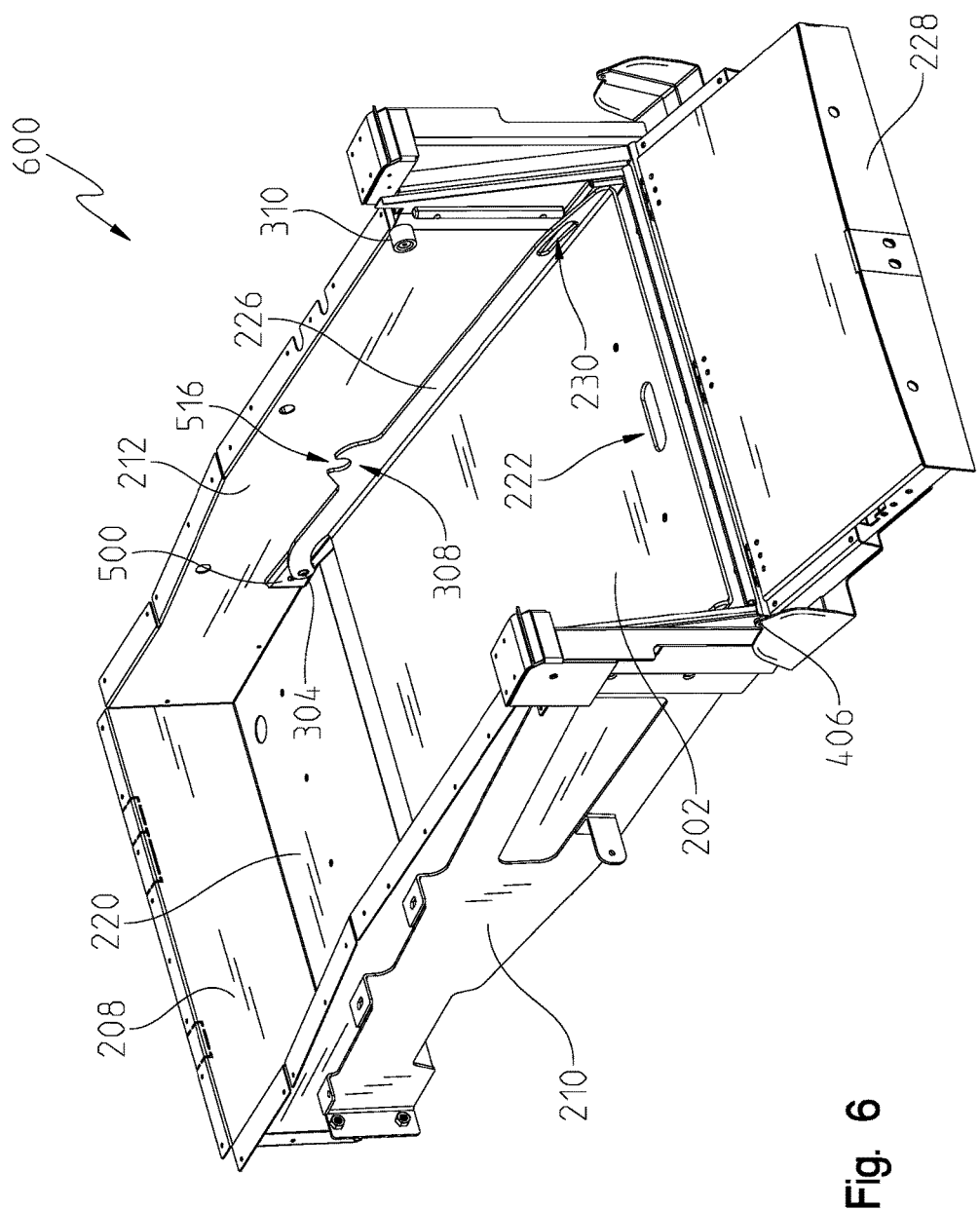
FIG. 6 is a rear perspective view of the ramp system of FIG. 2 with the ramp in a raised position and a rear member in a lowered position.
Figure 7:
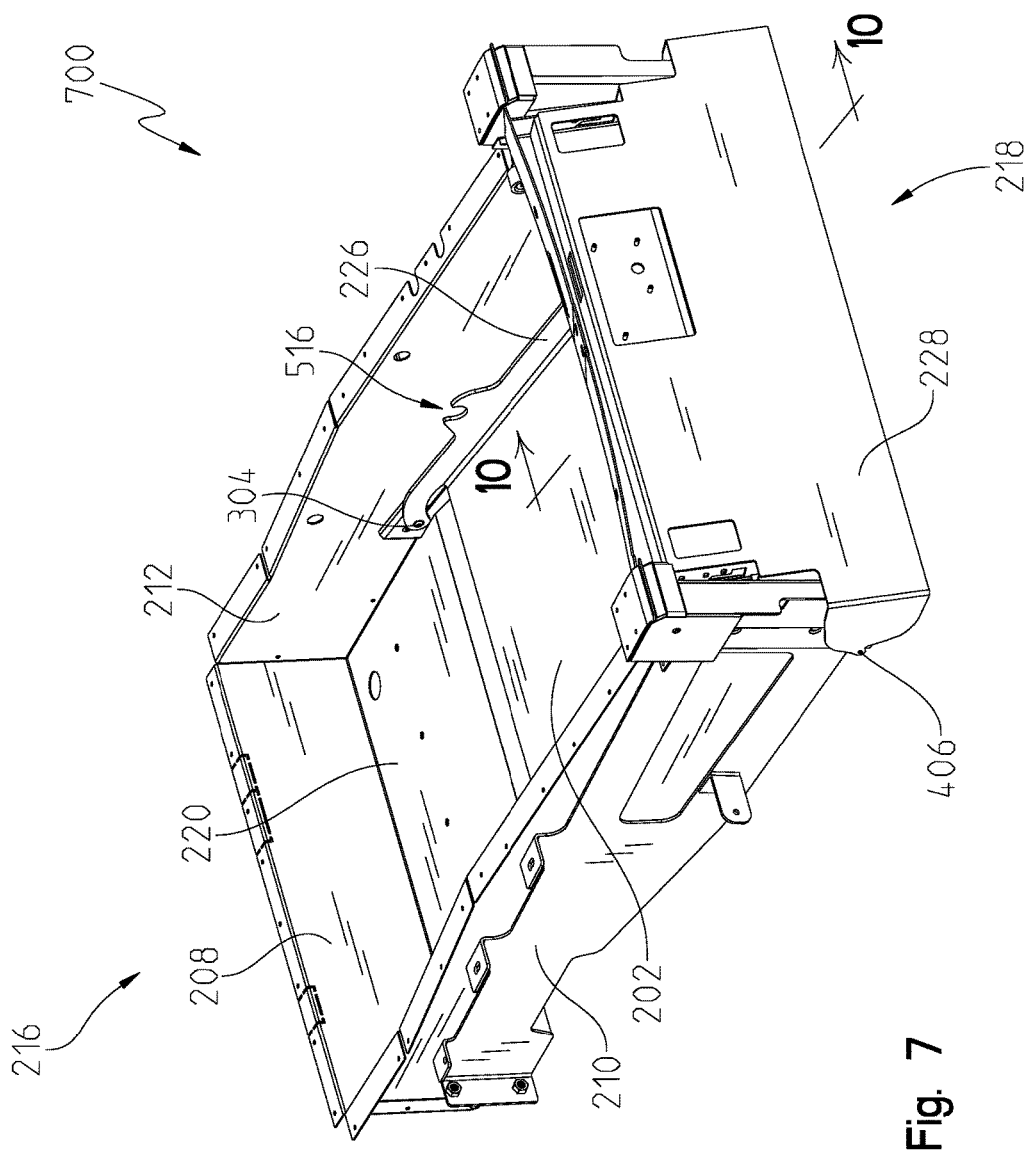
FIG. 7 is a rear perspective view of the ramp system of FIG. 2 with the ramp in the raised position and a rear member in a raised position.

Referring to FIG. 5, the pan 220 may be formed by a plurality of plates. For instance, the pan 220 may include a first plate 504, a second plate 506, and a third plate 508. Each plate may be secured or coupled to the vehicle floor via rivets or other fasteners 510. In other embodiments, there may be additional or fewer plates that form the pan 220. The inclusion of two or more plates allows the pan 220 to take the shape of an uneven surface. For instance, some of the mechanical components of the vehicle such as the driveline, rear axle, engine, transmission, exhaust system, etc. may require the vehicle floor to be uneven, i.e., unparallel from front to rear of the vehicle. The additional plates form the pan 220 to take shape of this lowered floor of the vehicle.

As also shown in the illustrated embodiment of FIG. 3, the first side panel 224 may include a first latch member 306. Likewise, the second side panel 226 may include a second latch member 308. Each latch member may be positioned along the respective side panel at a location between the pivot pin 304 and the side handle 230. In addition, each latch member may be structured to define an opening for receiving a pin 310 when the ramp 202 is moved to the stowed position. In other words, the first latch member 306 may define an opening 514 (see FIG. 5) for receiving one pin 310 and the second latch member 308 may define a different opening 516 for receiving another pin 310. In this embodiment, one pin 310 is coupled to the first side member 210 and the other pin 310 is coupled to the second side member 212. Both pins 310 are coupled to the respective side member towards the rear thereof, and at a location that is approximately vertically aligned with the pivot pin 304 of the ramp 202.

In the lowered position 300, the ramp 202 may be pivoted about its pivot pin 304 so that the first latch member 306 comes into contact with one pin 310 and the second latch member 308 comes into contact with the other pin 310. As shown, each latch member can form or define the respective opening therein by a pair of fingers that are structured like pinchers or claws. Thus, as the latch member comes into contact with the pin 310, the ramp 202 is pivoted about its pivot pin 304 an additional amount until the pin 310 becomes disposed within the respective opening. In this manner, the structure or design of each latch is such that when the pin 310 is engaged by each latch member, i.e., disposed within the opening formed by the latch member, the latch member partly surrounds the pin 310 to hold or maintain the ramp 202 in the stowed position. In other words, an additional force may be required to position the pin 310 within the respective opening formed by each of the first latch member 306 and the second latch member 308.

Figure 4:
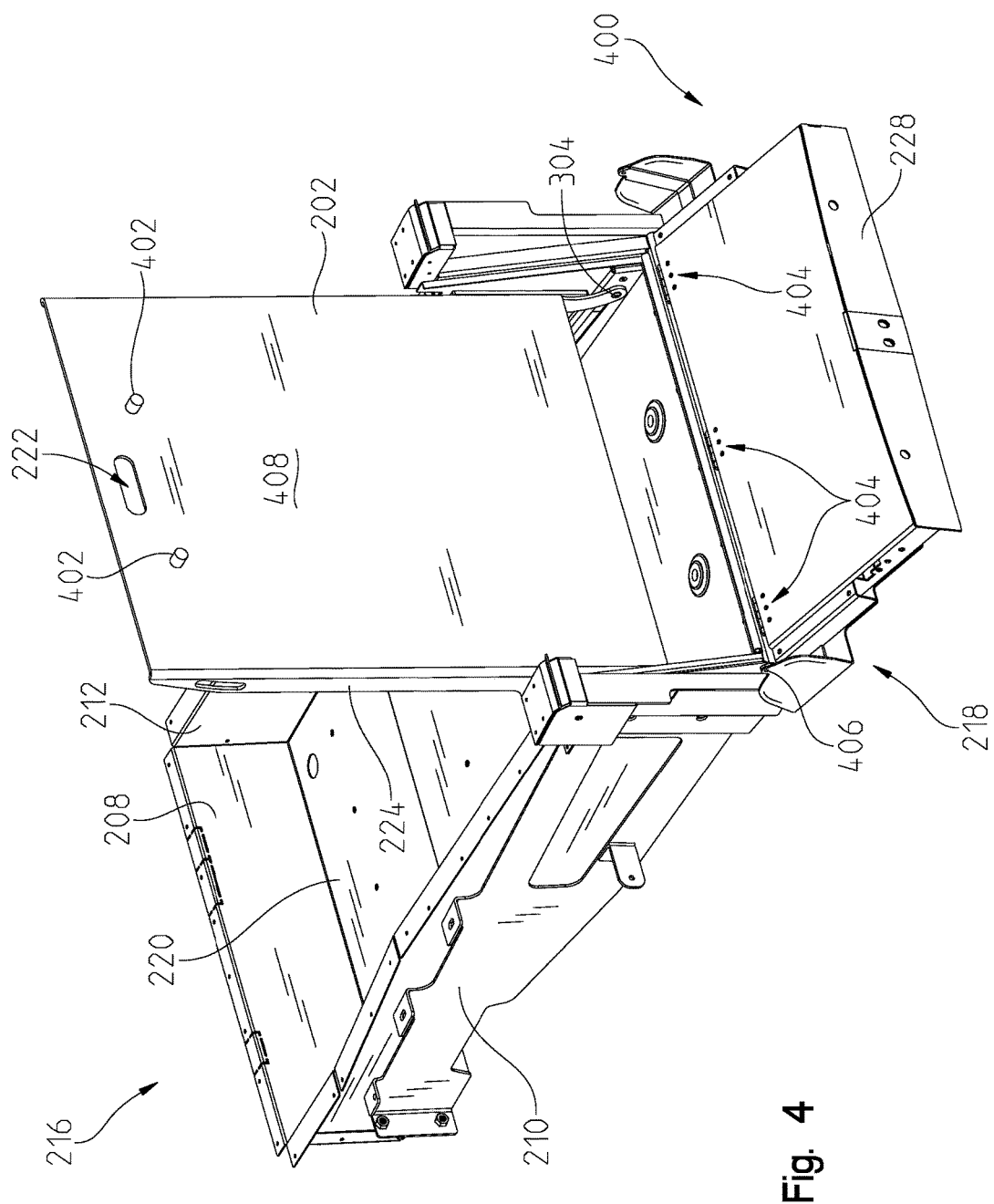
FIG. 4 is a rear perspective view of the ramp system of FIG. 2 with the ramp in the stowed position.

Referring to FIG. 4, the ramp 202 is disposed in its stowed position 400. As previously described, the ramp 202 includes a ramp surface 302. On the opposite side as the ramp surface 302, the ramp 202 may include an underneath surface 408 upon which one or more pads 402 are coupled. The pads 402 may be formed of an elastic material or a plastic. Other materials are also possible for the pads 402. The pads 402 may protrude from the underneath surface 408 when the ramp 202 is in its lowered position 300 so that each pad 402 contacts a ground surface. In this manner, the pads 402 offer support to the ramp 202. The pads 402 may be secured to the ramp 202 via one or more fasteners 512 (see FIG. 5).

In FIG. 4, the rear member 228 is shown being positioned in an open position. The rear member 228 is capable of moving between this open position and a closed position, e.g., see FIG. 7. The ramp 202 and rear member 228 are independently coupled to the ramp system 200, and thus each is capable of being moved independently from the other. When the rear member is in the open position, for example, it is possible to maneuver or position the ramp 202 in any one of three positions. For instance, the ramp 202 may be disposed in a raised or stored position 600 (i.e., see FIG. 6), the lowered or deployed position 300 (i.e., see FIGS. 3 and 5), and the stowed position 400 (i.e., see FIG. 4). In the closed position, however, the ramp 202 can only be maneuvered or positioned in its raised position or stowed position, i.e., the ramp 202 cannot be moved to its lowered or deployed position with the rear member 228 in the closed position.

The rear member 228 can pivot about a pivot point 406 as shown in FIG. 4. Moreover, the rear member 228 may be coupled to the floor 220 of the enclosure 204 via a plurality of hinges 404 to allow for the pivotal movement. The pivot point 406 of the rear member 228 may be different from the pivot pin 304 of the ramp 202, such that the ramp 202 and rear member 228 are independent from one another. In other words, the rear member 228 may be pivoted between its open and closed position independently from the ramp 202, and similarly the ramp 202 may be pivoted between its raised position, lowered position, and stowed position independently of the rear member 228. This may be possible with the ramp 202 and rear member 228 not being coupled directly to one another. In many conventional ramp systems, a conventional ramp is directly coupled to a rear tailgate structure such that both pivot in unison with one another.

Referring now to FIG. 5, the ramp system is shown with the ramp 202. In its lowered position 300 and the rear member 228 in its open position. In order to reach its lowered position, the ramp 202 can be in a sliding engagement or slidably coupled to a track system. As shown, a longitudinally-extending track 500 is coupled to the second side member 212. Likewise, another track (not shown) is coupled to the first side member 210 in a way such that both tracks 500 are in approximate alignment with one another.

Each track 500 defines a guide channel 502. The guide channel 502 may include a first end 518 and a second end 520. The first end 518 may be positioned near a front 216 of the ramp system 200, whereas the second end 520 may be positioned near a rear 218 thereof. The ramp 202 may move through the guide channel 502 between the first end 518 and the second end 520, such that at the first end 518 the ramp 202 is disposed in its raised position and at the second end 520 the ramp 202 is disposed at its lowered position. This is further shown in FIGS. 8 and 9.

Figure 8:
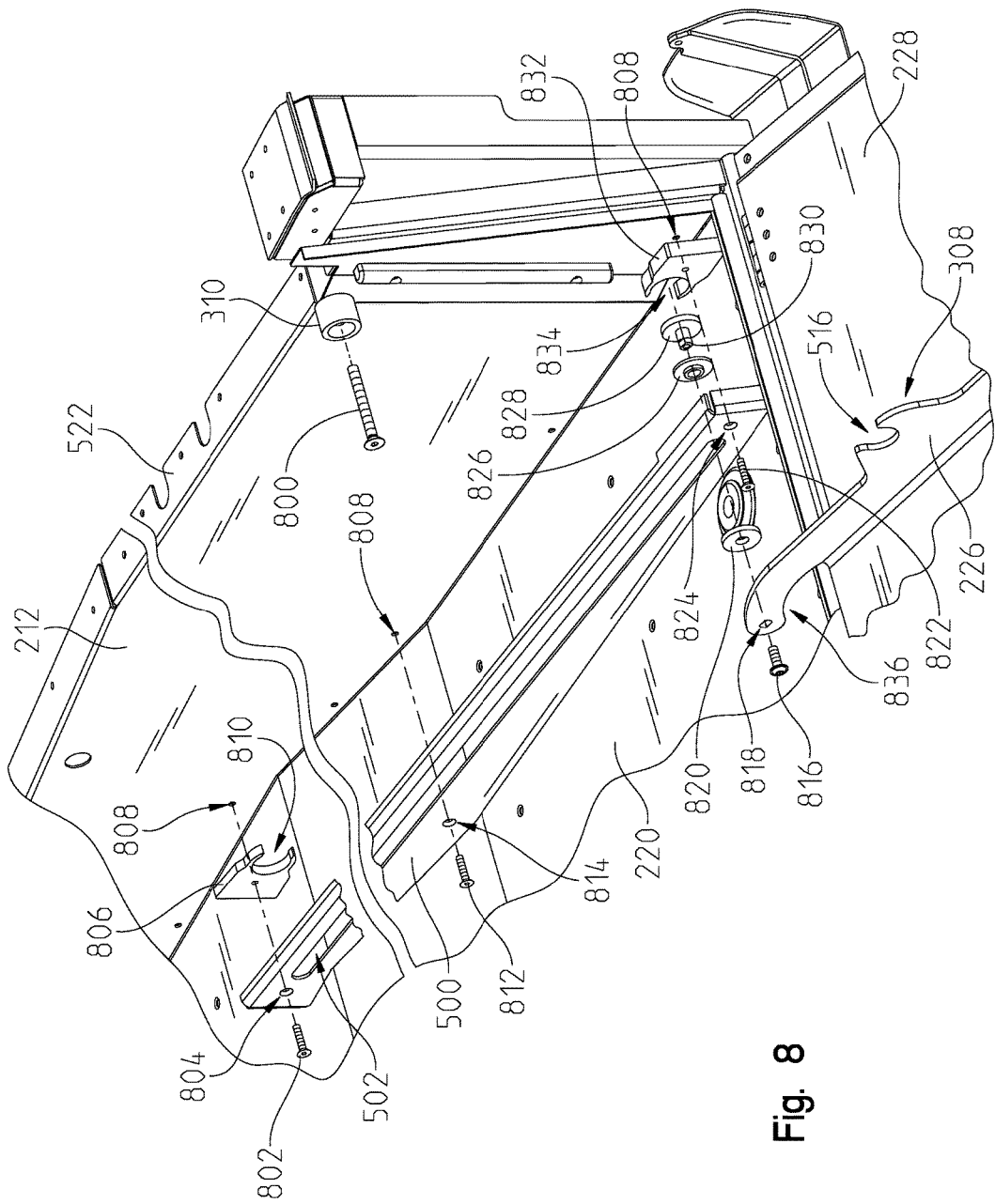
FIG. 8 is a partially exploded, rear perspective view of the ramp system of FIG. 5.
Figure 9:
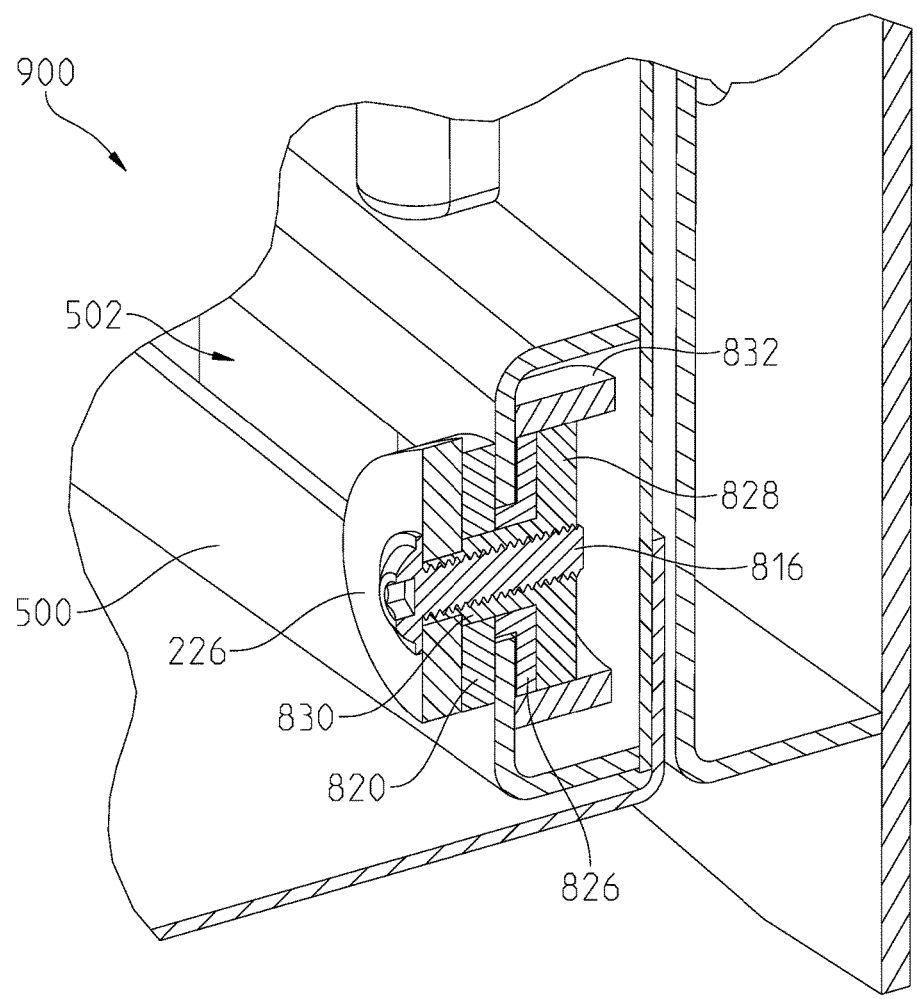
FIG. 9 is a cross-sectional rear perspective view taken along line 9-9 in FIG. 5.

In FIG. 8, for example, the manner in which the second side panel 226 of the ramp 202 is coupled to the track 500 is shown. Here, the second side panel 226 includes a curved end 836 this is located at or near the pivot location of the ramp 202. As described above, the ramp 202 may pivot about a pivot pin 304. In FIG. 8, the pivot pin 304 is shown as being formed by a pin 816 that is inserted through a correspondingly defined hole 818 in the curved end 836 of the side panel 226. The hole 818 is shaped as a key-like slot capable of receiving a key 830. The key 830 protrudes from a cap 828 that is positioned on a side opposite the track 500 from the side panel 226. The cap 828 has an annular cross-section as shown in FIG. 9. Moreover, the key 830 includes a threaded opening which may receive the pin 816 in a threaded engagement.

In this embodiment, a washer or bushing 820 may be positioned between an outer wall of the side panel 226 and an inner wall of the track 500. The pin 816 may pass through the hole 818 defined in the side panel 226 and a corresponding opening defined in the washer or bushing 820. In addition, the key 830 may pass through an opening defined in a second washer or bushing 826. The second washer or bushing 826 may be positioned in contact with an outer wall of the track 500. As shown best in FIG. 9, the key 830 may pass through the guide channel 502 for coupling to the pin 816. As such, the pin 816 may be tightened in threaded engagement with the key 830. The engagement of the key 830 and pin 816 may move or slide within the guide channel 502 between its first end 518 and its second end 520 to allow the ramp 202 to move between its raised and lowered positions.

In the lowered position, the cap 828 may be received within an opening 834 defined within a coupler 832. The coupler 832 includes a main body with a through-hole defined therein. A screw or other fastener 822 may pass through a corresponding opening 824 in the track 500 and be coupled to the coupler 832 via the through-hole. For example, the screw or fastener 822 may be threadedly engaged with the through-hole in the coupler 832 to secure the coupler 832 and track 500 to one another. As also shown, the second side member 212 may include an opening or through-hole 808 for receiving the screw or fastener 822 as well. Thus, the track 500 and coupler 832 may be coupled to the second side member 212.

At the opposite end of the track 500, i.e., near the front 216 or first end 518 of the guide channel 502, another coupler 806 may be provided. This coupler 806 may be shaped similarly to the coupler 832 previously described, i.e., having an opening 810 capable of receiving the cap 828. A screw or fastener 802 may secure the track 500 via an opening 804 and coupler 806 to the second side member 212 via hole 808 as shown. The second side member 212 may include a plurality of holes 808 such that the track 500 may be secured at two or more locations along its longitudinal length. In FIG. 8, for example, another screw or fastener 812 is shown capable of being inserted through a hole 814 defined in the track 500 at some location between the two ends thereof. The screw or fastener 812 may be coupled to one of the plurality of holes 808 in the second side member 212 as shown.

Referring to the cross-section 900 of FIG. 9, the pin 816 is shown being coupled to the key 830 and cap 828. The pin 816 is positioned within the guide channel 502 at a location between the first and second ends. In the location shown in FIG. 9, the cap 828 is coupled or "snapped" into engagement with the second coupler 832.

Each of the first coupler 806 and second coupler 832 are structurally designed to include an opening or open end capable of receiving the cap 828. In the raised position, the ramp 202 can be pushed toward the front 816 of the vehicle 100 until the cap 828 enters and is received in the open end 810 of the first coupler 806. In one example, the engagement between the first coupler 806 and the cap 828 may be a snap-fit engagement. Once engaged, the ramp 202 may rotate or pivot about its pivot location 304, but the coupler 806 is capable of retaining the cap 828 from sliding or moving within the guide channel 502.

Likewise, the second coupler 832 is structured similar to the first coupler 806 for receiving the cap 828. The second coupler 832 also includes an open end or opening 834 for receiving the cap 828. An engagement between the cap 828 and second coupler 832 may be a snap-fit engagement, for example. Other types of engagement between the cap 828 and the first and second couplers is also possible, e.g., a latching engagement between a slide-bolt and latch opening. In any event, the ramp 202 may freely rotate or pivot about the pivot location 304 while retained or coupled to the first and second couplers. Moreover, when the cap 828 is coupled to the second coupler 832, the ramp 202 may be pivoted between its stowed position and lowered position. The ramp 202 may not pivot any further than its stowed position due to the engagement of the first and second latch members 306, 308 with the pins 310. As shown further in FIG. 8, each pin 310 may be coupled to its respective side member via a screw, bolt, or other fastener 800.

While the embodiments of FIGS. 5-8 only show one track 500 coupled to the second side member 212, a similar track 500 is coupled to the first side member 210. A first coupler 806 and a second coupler 832 may also be coupled to the first side member 210 as well to enable the ramp 202 to move within the guide channels 502 of both tracks 500 in a sliding manner.

Figure 10:
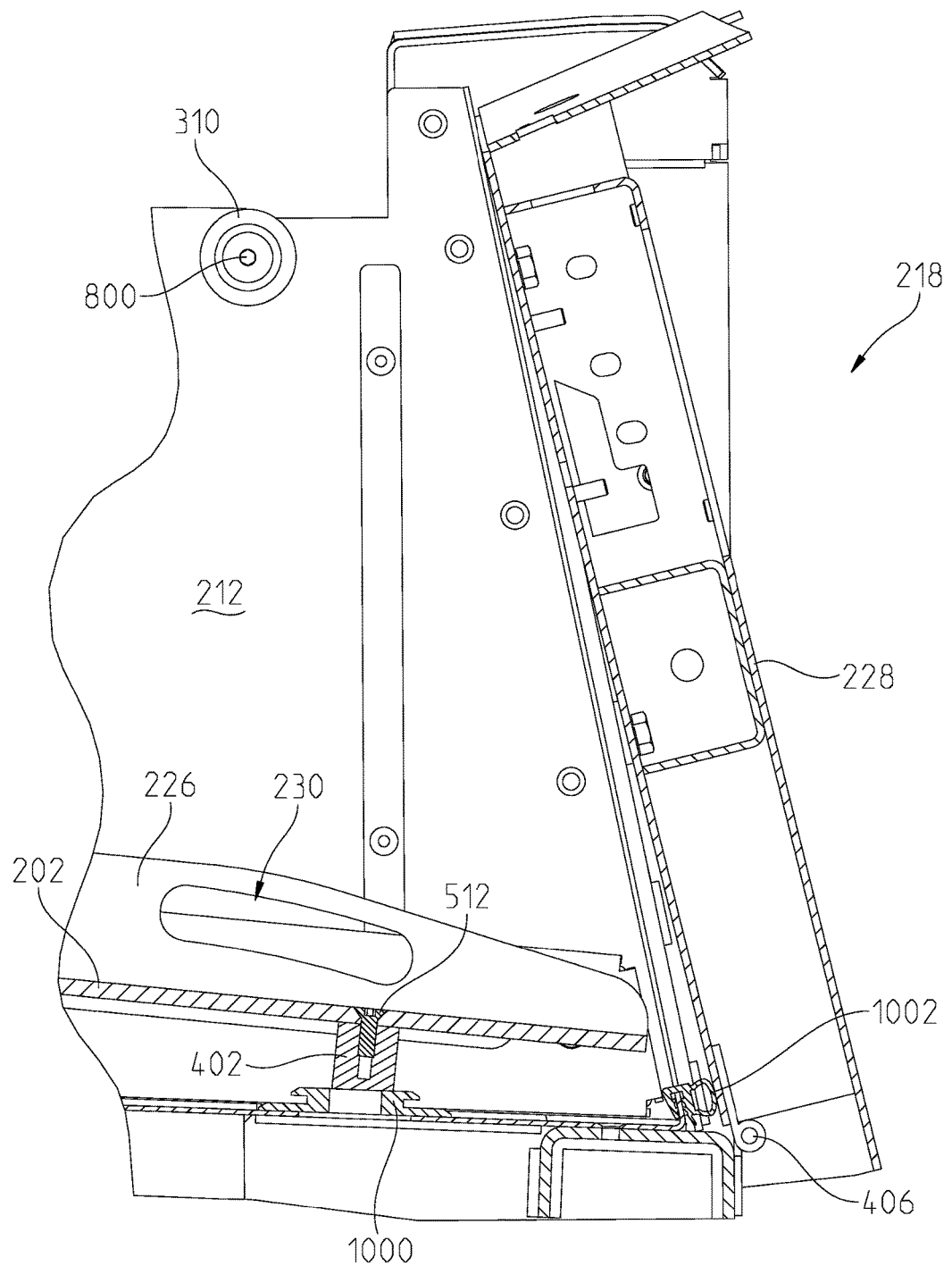
FIG. 10 is a side cross-sectional view of a portion of the ramp system of FIG. 7.

As shown in FIG. 10, the ramp 202 is configured in its raised position and the rear member 828 is disposed in its closed position. Here, a cross-section of the aforementioned pad 402 is shown. The pad 402 can be fastened to the ramp 202 via a screw or fastener 512 as previously described. The pad 402 can isolate the ramp 202 from the pan 220 to thereby reduce rattle or other noise during vehicle operation. In some embodiments, the pad 402 may also contact the ground surface when the ramp is disposed in its lowered position, although this is not the case in all embodiments.

As also shown, a wheelchair tie down restraint 1000 may be provided. A rear belt retractor may couple to the restraint 1000. In some embodiments, this may not be present. A rear weather strip seal 1002 is also shown in FIG. 10. This feature may be optional in some embodiments.

The ramp system 200 described above and shown in the accompanying drawings provides for a less complicated mechanism than other conventional ramp systems. In addition, this ramp system 200 allows for additional storage space when the ramp system is designed for a rear or side access to a vehicle. While the accompanying drawings illustrate the ramp system 200 for a rear access vehicle, it is within the scope of this disclosure that the ramp system 200 may be designed for a side access vehicle as well.

In any event, luggage and other items may be stowed in the rear or side of the vehicle, and the ramp 202 does not obstruct or prevent items from being stowed as in many conventional ramp systems. Moreover, the ramp 202 is capable of being retracted from its raised position to its lowered position, or pivoted between its lowered and stowed positions in an easier manner than many conventional ramp systems. The ramp system 200 is coupled to the vehicle, but the ramp 202 is independent from the rear member 228. Thus, the ramp 202 is easy to maneuver between positions as needed.

The ramp system 200 may be welded or otherwise coupled to the vehicle to add rigidity and security to the overall system. In some embodiments, the vehicle floor may be dropped or lowered by up to 14" from its conventional floor level in order to accommodate the ramp system 200.

In some embodiments, a latching mechanism in the form of a slide bolt may be used to secure the ramp 202 in the stowed position rather than the engagement of the latch members and pins 310. One skilled in the art may appreciate other mechanisms that can be used to secure or couple the ramp 202 in the stowed position.

Additional features and embodiments of the present disclosure are contemplated. Among these features is a slotted opening formed in the tracks 500 to allow the ramp 202 to be removably coupled thereto. The slotted opening may be angled and a top portion of the coupler may limit movement of the ramp 202 out of engagement with the track. Thus, the ramp 202 may be shifted laterally or lifted at an angle to become disengaged from the track 500 via the slotted opening.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A retractable ramp system, comprising:
a frame including a front member, a first side member, a second side member, a rear member, and a frame floor, the rear member being pivotally coupled to the frame so that the rear member is pivotal between an open position and a closed position;
a first track coupled to the first side member and defining a longitudinal channel therein, the longitudinal channel of the first track including first and second terminating ends, the first terminating end being positioned longitudinally between the second terminating end and the front member of the frame;
a second track coupled to the second side member and defining a longitudinal channel therein, the longitudinal channel of the second track including first and second terminating ends, the first terminating end being positioned longitudinally between the second terminating end and the front member of the frame;
a ramp pivotably coupled to the first and second tracks about a pivot axis, the ramp including a ramp floor, a first side panel, and a second side panel;
a first latch member coupled to the first side panel and a second latch member coupled to the second side panel; and
a pin coupled to one of the first side member and the second side member;
wherein the ramp is movable between (i) a raised position in which a portion of the ramp is aligned longitudinally with the first terminating end of the first longitudinal channel and the first terminating end of the second longitudinal channel, (ii) a lowered position, and (iii) a stowed position,
wherein in the raised position the ramp floor extends across a portion of the frame floor and does not extend across another portion of the frame floor; and
wherein one of the first latch member and the second latch member is coupled to the pin in the stowed position.

2. The system of claim 1, wherein the pin comprises a first pin coupled to the first side member and a second pin coupled to the second side member.

3. The system of claim 2, wherein the first latch member is coupled to the first pin and the second latch member is coupled to the second pin in the stowed position.

4. The system of claim 1, wherein the ramp is slidably coupled to the first track and the second track between the raised position and the stowed position.

5. The system of claim 1, wherein the ramp is independent from the rear member.

6. The system of claim 1, wherein the ramp is disposable in the lowered position only when the rear member is in the open position.

7. The system of claim 1, wherein the each of the first terminating end of the first longitudinal channel and the first terminating end of the second longitudinal channel are spaced from the front member such that the another portion of the frame floor is exposed when the ramp is in the raised position.

8. The system of claim 1, further comprising one or more pads coupled to the ramp.

9. The system of claim 1, wherein the frame floor comprises at least a first portion and a second portion, the first and second portions configured to be coupled to a floor of a vehicle.

10. A retractable ramp system comprising:
a frame including a front member, a first side member, a second side member, a rear member, and a floor, the rear member being pivotally coupled to the frame so that the rear member is pivotal between an open position and a closed position;
a first track coupled to the first side member and defining a longitudinal channel therein;
a second track coupled to the second side member and defining a longitudinal channel therein;
a ramp pivotably coupled to the first and second tracks about a pivot axis, the ramp including a ramp floor, a first side panel, and a second side panel;
a first latch member coupled to the first side panel and a second latch member coupled to the second side panel;
a pin coupled to one of the first side member and the second side member;
a pivot pin;
a cap including an annular body, and a key protruding from the annular body;
wherein, the pivot pin is received within an opening defined in the key such that the ramp is pivotable about the pivot pin and key;
wherein, the ramp is movable between a raised position, a lowered position, and a stowed position; and
further wherein, one of the first latch member and the second latch member is coupled to the pin in the stowed position.

11. The system of claim 10, further comprising a coupler coupled to one of the first track and second track, the coupler having an open end for receiving the annular body of the cap.

12. The system of claim 11, wherein the coupler comprises a first coupler and a second coupler, the first coupler being coupled to one end of the respective track and the second coupler being coupled to an opposite end thereof.

13. The system of claim 11, wherein a movement of the ramp is restricted to a pivotal movement only when the cap is coupled to the coupler.

14. A retractable ramp system for a vehicle having a conventional floor, the vehicle configured to transport an individual using a mobility vehicle, the retractable ramp system comprising:
a frame including a front member, a first side member, a second side member, a rear member, and a frame floor, the rear member being pivotally coupled to the frame so that the rear member is pivotal between an open position and a closed position, wherein a portion of the frame is aligned with the conventional floor to provide a space to surround the mobility vehicle when disposed inside the vehicle;
a track system coupled to the frame and defining a longitudinal channel including first and second terminating ends, the first terminating end being positioned longitudinally between the second terminating end and the front member of the frame; and,
a ramp pivotably and slidably coupled to the track system, the ramp including a ramp floor, a first side panel, and a second side panel;
wherein the ramp is movable between (i) a raised position in which a portion of the ramp is aligned longitudinally with the first terminating end of the longitudinal channel and the ramp is located in a space lower than the conventional floor, (ii) a lowered position, and (iii) a stowed position; and wherein the rear member is movable between a closed position and an open position.

15. The system of claim 14, wherein the rear member is pivotably coupled to the frame with a first pivot pin, and the ramp is pivotably coupled to the track system with a second pivot pin, wherein the second pivot pin is located between the first side member and the second side member and the first pivot pin is displaced from the location of the second pivot pin.

16. The system of claim 15, wherein the lowered position of the ramp blocks movement of the rear member from the open position to the closed position.

17. The system of claim 16, further comprising a latch member coupled to one of the frame and the ramp and a pin coupled to the other of the frame and the ramp, wherein the latch member is coupled to the pin in the stowed position, and wherein the ramp in the stowed position is located between the rear member and one of the latch member and pin coupled to the frame.

18. The system of claim 17, wherein the latch member includes a first latch member coupled to the first side panel and a second latch member coupled to the second side panel.

19. The system of claim 18, wherein the pin includes a first pin coupled to the first side member and a second pin coupled to the second side member, and wherein the first pin is coupled to the first latch member in the stowed position and the second pin is coupled to the second latch member in the stowed position.

20. The system of claim 19, wherein the first latch member defines a first opening and the second latch member defines a second opening, and wherein each of the first opening and the second opening are configured to respectively receive the first pin and the second pin in the stowed position.

* * * * *